(12) United States Patent
Bredt et al.

(10) Patent No.: US 7,087,109 B2
(45) Date of Patent: Aug. 8, 2006

(54) THREE DIMENSIONAL PRINTING MATERIAL SYSTEM AND METHOD

(75) Inventors: James F. Bredt, Watertown, MA (US); Sarah Clark, Somerville, MA (US); Grieta Gilchrist, Albuquerque, NM (US)

(73) Assignee: Z Corporation, Burlington, MA (US)

( * ) Notice: Subject to any disclaimer, the term of this patent is extended or adjusted under 35 U.S.C. 154(b) by 208 days.

(21) Appl. No.: 10/255,139

(22) Filed: Sep. 25, 2002

(65) Prior Publication Data

US 2004/0056378 A1    Mar. 25, 2004

(51) Int. Cl.
*C04B 28/10*    (2006.01)
(52) U.S. Cl. .................... 106/691; 106/31.13; 106/690
(58) Field of Classification Search ................ 106/683, 106/689, 690, 691, 31.13; 524/4, 5
See application file for complete search history.

(56) References Cited

U.S. PATENT DOCUMENTS

| | | | |
|---|---|---|---|
| 2,522,548 A | 9/1950 | Streicher | |
| 3,525,632 A | 8/1970 | Enoch | |
| 3,821,006 A | 6/1974 | Schwartz | |
| 3,926,870 A | 12/1975 | Keegan et al. | |
| 3,930,872 A | 1/1976 | Toeniskoetter et al. | |
| 4,369,025 A | 1/1983 | von der Weid | |
| 4,444,594 A | 4/1984 | Paddison et al. | |
| 4,665,492 A | 5/1987 | Masters | |
| 4,755,227 A | 7/1988 | Sherif et al. | |
| 4,758,278 A | 7/1988 | Tomic | |
| 4,863,538 A | 9/1989 | Deckard | |
| 4,938,816 A | 7/1990 | Beaman et al. | |
| 4,944,817 A | 7/1990 | Bourell et al. | |
| 5,017,753 A | 5/1991 | Deckard | |
| 5,053,090 A | 10/1991 | Beaman et al. | |
| 5,076,869 A | 12/1991 | Bourell et al. | |
| 5,132,143 A | 7/1992 | Deckard | |
| 5,147,587 A | 9/1992 | Marcus et al. | |
| 5,154,762 A | 10/1992 | Mitra et al. | |
| 5,155,324 A | 10/1992 | Deckard et al. | |
| 5,176,188 A | 1/1993 | Quinn et al. | |
| 5,204,055 A | 4/1993 | Sachs et al. | |
| 5,252,264 A | 10/1993 | Forderhase et al. | |
| 5,279,665 A * | 1/1994 | Yunovich et al. ........... 106/690 |
| 5,296,062 A | 3/1994 | Bourell et al. | |
| 5,301,415 A | 4/1994 | Prinz et al. | |
| 5,316,580 A | 5/1994 | Deckard | |
| 5,340,656 A | 8/1994 | Sachs et al. | |
| 5,342,919 A | 8/1994 | Dickens et al. | |
| 5,352,405 A | 10/1994 | Beaman et al. | |
| 5,382,289 A * | 1/1995 | Bambauer et al. .......... 106/690 |
| 5,382,308 A | 1/1995 | Bourell et al. | |
| 5,393,613 A | 2/1995 | MacKay | |
| 5,429,788 A | 7/1995 | Ribble et al. | |
| 5,430,666 A | 7/1995 | DeAngelis et al. | |
| 5,433,280 A | 7/1995 | Smith | |
| 5,460,758 A | 10/1995 | Langer et al. | |
| 5,490,882 A | 2/1996 | Sachs et al. | |
| 5,490,962 A | 2/1996 | Cima et al. | |
| 5,518,680 A | 5/1996 | Cima et al. | |
| 5,527,877 A | 6/1996 | Dickens et al. | |
| 5,536,467 A | 7/1996 | Reichle et al. | |
| 5,593,531 A | 1/1997 | Penn | |
| 5,595,597 A | 1/1997 | Fogel et al. | |
| 5,597,589 A | 1/1997 | Deckard | |
| 5,616,294 A | 4/1997 | Deckard | |
| 5,622,577 A | 4/1997 | O'Connor | |
| 5,632,848 A | 5/1997 | Richards et al. | |
| 5,637,175 A | 6/1997 | Feygin et al. | |
| 5,639,070 A | 6/1997 | Deckard | |
| 5,639,402 A | 6/1997 | Barlow et al. | |
| 5,640,667 A | 6/1997 | Freitag et al. | |
| 5,648,450 A | 7/1997 | Dickens et al. | |
| 5,653,925 A | 8/1997 | Batchelder | |
| 5,658,712 A | 8/1997 | Steinmann et al. | |
| 5,660,621 A | 8/1997 | Bredt | |
| 5,697,043 A | 12/1997 | Baskaran et al. | |
| 5,718,757 A * | 2/1998 | Guillou et al. ............... 106/691 |
| 5,730,925 A | 3/1998 | Mattes et al. | |
| 5,733,497 A | 3/1998 | McAlea et al. | |
| 5,749,041 A | 5/1998 | Lakshminarayan et al. | |

(Continued)

FOREIGN PATENT DOCUMENTS

DE    19853834    5/2000

(Continued)

OTHER PUBLICATIONS

Borland, "Characterization of Fundamental and Reticulated Biomedical Polymer Structures Fabricated by Three Dimensional Printing," Thesis, MIT,(Jun. 1995.).

(Continued)

*Primary Examiner*—David M Brunsman
(74) *Attorney, Agent, or Firm*—Goodwin Procter LLP

(57) ABSTRACT

The present invention is directed to a three-dimensional printing system and method, and an article made therefrom. The method of the present invention includes building cross-sectional portions of a three dimensional article, and assembling the individual cross-sectional areas in a layer-wise fashion to form a final article. The individual cross-sectional areas are built using an ink-jet printhead to deliver an aqueous fluid to a particle material that includes a first particulate material, a second particulate material, and a third particulate material, wherein the first and second particulate materials react in the presence of the fluid in a period of time, and the third particulate material reacts in the presence of the fluid to form a solid in a longer period of time.

13 Claims, 3 Drawing Sheets

U.S. PATENT DOCUMENTS

| | | | |
|---|---|---|---|
| 5,753,171 A | 5/1998 | Serbin et al. |
| 5,753,274 A | 5/1998 | Wilkening et al. |
| 5,772,947 A | 6/1998 | Hull et al. |
| 5,805,971 A | 9/1998 | Akedo |
| 5,851,465 A | 12/1998 | Bredt |
| 5,870,307 A | 2/1999 | Hull et al. |
| 5,902,441 A | 5/1999 | Bredt et al. |
| 5,902,537 A | 5/1999 | Almquist et al. |
| 5,976,339 A | 11/1999 | André, Sr. |
| 6,007,318 A | 12/1999 | Russell et al. |
| 6,112,109 A | 8/2000 | D'Urso |
| 6,136,088 A | 10/2000 | Farrington |
| 6,147,138 A | 11/2000 | Höchsmann et al. |
| 6,193,922 B1 | 2/2001 | Ederer |
| 6,299,677 B1 | 10/2001 | Johnson et al. |
| 6,397,922 B1 | 6/2002 | Sachs et al. |
| 6,403,002 B1 | 6/2002 | van der Geest |
| 6,416,850 B1 | 7/2002 | Bredt et al. |
| 6,423,255 B1 | 7/2002 | Hoechsmann et al. |
| 6,610,429 B1 | 8/2003 | Bredt et al. |
| 2002/0106412 A1 | 8/2002 | Rowe et al. |
| 2004/0038009 A1 | 2/2004 | Leyden et al. |

FOREIGN PATENT DOCUMENTS

| | | |
|---|---|---|
| DE | 101 58 233 | 3/2003 |
| EP | 0 431 924 | 6/1991 |
| JP | 2001-162351 | 6/2001 |
| WO | 93/25336 | 12/1993 |
| WO | 95/30503 | 11/1995 |
| WO | 97/26302 | 7/1997 |
| WO | 98/09798 | 3/1998 |
| WO | 98/28124 | 7/1998 |
| WO | WO 00 26026 | 5/2000 |
| WO | WO 01 34371 | 5/2001 |

OTHER PUBLICATIONS

Ederer, "A 3D Print Process for Inexpensive Plastic Parts," Presentation for the Austin Solid Freeform Conference (1995.), no month provided.

Khanuja, "Origin and Control of Anisotropy in Three Dimensional Printing of Structural Ceramics," Thesis, MIT,(Feb. 1996.).

International Search Report for PCT/US03/29714,(Feb. 10, 2004.)6 pages.

Boyer et al., "Metals Handbook," American Society for Metals, pp. 23-25 and 23-8-13, (1985), no month provided.

German, *Powder Injection Molding*, (1990), no month provided, pp. 32-43 and 92-95.

\* cited by examiner

THREE DIMENSIONAL PRINTING MATERIAL SYSTEM AND METHOD

BACKGROUND

This application relates generally to rapid prototyping techniques and, more particularly to a Three Dimensional Printing material and method using particulate mixtures.

The field of rapid prototyping involves the production of prototype articles and small quantities of functional parts, as well as structural ceramics and ceramic shell molds for metal casting, directly from computer-generated design data.

Two well-known methods for rapid prototyping include a selective laser sintering process and a liquid binder Three Dimensional Printing process. The techniques are similar to the extent that they both use layering techniques to build three-dimensional articles. Both methods form successive thin cross sections of the desired article. The individual cross sections are formed by bonding together grains of a granular material on a flat surface of a bed of the granular material. Each layer is bonded to a previously formed layer to form the desired three-dimensional article at the same time as the grains of each layer are bonded together. The laser-sintering and liquid binder techniques are advantageous because they create parts directly from computer-generated design data and can produce parts having complex geometries. Moreover, Three Dimensional Printing can be quicker and less expensive than conventional machining of prototype parts or production of cast or molded parts by conventional "hard" or "soft" tooling techniques which can take from a few weeks to several months, depending on the complexity of the item.

Three Dimensional Printing has been used to make ceramic molds for investment casting, thereby generating fully-functional metal parts. Additional uses have been contemplated for Three Dimensional Printing.

For example, three Dimensional Printing may be useful in design-related fields where it is used for visualization, demonstration and mechanical prototyping. It may also be useful for making patterns for molding processes. Three Dimensional Printing techniques may be further useful, for example, in the fields of medicine and dentistry, where expected outcomes may be modeled prior to performing procedures. Other businesses that could benefit from rapid prototyping technology include architectural firms, as well as others in which visualization of a design is useful.

A selective laser sintering process is described in U.S. Pat. No. 4,863,538 to Deckard, which is incorporated herein by reference for all purposes. The selective laser sintering process was commercialized by DTM and acquired by 3D Systems. The selective laser sintering process involves spreading a thin layer of powder onto a flat surface. The powder is spread using a tool developed for use with the selective laser sintering process, known in the art as a counter-rolling mechanism (hereinafter "counter-roller"). Using the counter-roller allows thin layers of material to be spread evenly, without disturbing previous layers. After the layer of powder is spread onto the surface, a laser directs laser energy onto the powder in a predetermined two-dimensional pattern. The laser sinters or fuses the powder together in the areas struck by its energy. The powder can be plastic, metal, polymer, ceramic or a composite. Successive layers of powder are spread over previous layers using the counter-roller, followed by sintering or fusing with the laser. The process is essentially thermal, requiring delivery by the laser of a sufficient amount of energy to sinter the powder together, and to previous layers, to form the final article.

U.S. Pat. No. 5,639,402 to Barlow, incorporated herein by reference for all purposes, discloses a method for selectively fusing calcium phosphate particles that are coated, or alternatively mixed with, a polymeric binder material.

U.S. Pat. No. 5,204,055, to Sachs et al. incorporated herein by reference for all purposes, describes an early Three Dimensional Printing technique which involves the use of an ink-jet printing head to deliver a liquid or colloidal binder material to layers of powdered material. The Three Dimensional ink-jet printing technique (hereafter "liquid binder method") involves applying a layer of a powdered material to a surface using a counter-roller. After the powdered material is applied to the surface, the inkjet printhead delivers a liquid binder to the layer of powder. The binder infiltrates into gaps in the powder material, hardening to bond the powder material into a solidified layer. The hardened binder also bonds each layer to the previous layer. After the first cross-sectional portion is formed, the previous steps are repeated, building successive cross-sectional portions until the final article is formed. Optionally, the binder can be suspended in a carrier which evaporates, leaving the hardened binder behind. The powdered material can be ceramic, metal, plastic or a composite material, and can also include fiber. The liquid binder material can be organic or inorganic. Typical organic binder materials used are polymeric resins, or ceramic precursors such as polycarbosilazane. Inorganic binders are used where the binder is incorporated into the final articles; silica is typically used in such an application.

U.S. Pat. No. 5,490,962 to Cima, incorporated herein by reference for all purposes, discloses solid free-form techniques for making medical devices for controlled release of bioactive agents.

U.S. Pat. No. 6,397,922 to Sachs et al., incorporated herein by reference for all purposes, discloses a layered fabrication technique used to create a ceramic mold and is incorporated herein by reference for all purposes.

One advantage of using an ink-jet printhead rather than a laser is that a plurality of spray nozzles used to deliver binder to the powder can be arranged side-by-side in a single printhead. In selective laser sintering machines, only one laser, which delivers energy to the powder, is conventionally used. The combination of several spray nozzles increases the speed of liquid binder printing compared to laser-sintering by allowing a wider area to be printed at one time. In addition, the liquid binder printing equipment is much less expensive than the laser equipment due to the high cost of the laser and the high cost of the related beam deflection optics and controls.

However, three-dimensional printing materials may be susceptible to deformation during and after the printing process if sufficient bond strength within and between layers has not adequately developed.

In addition, the powders, especially metallic powders, used in both selective laser sintering and liquid binder techniques present safety issues that render them undesirable for use in an office environment. These safety issues may require special clothing and processing facilities to prevent, for example, skin contact or inhalation of toxic materials. In addition, more expense may be incurred through complying with regulations for the disposal of toxic materials.

SUMMARY

One aspect of the invention is directed to an article comprising a product of a mixture of a plurality of particles of a first particulate material, a second particulate material and a third particulate material. The first particulate material and the second particulate material can react to form a solid in a period of time, and the third particulate material can solidify in a longer period of time. In another embodiment, the mixture of the plurality of particles may also include a filler. In another embodiment, the first particulate material is a phosphate. In another embodiment, the second particulate material is an alkaline oxide. In yet another embodiment, the first particulate material is a plaster. In another embodiment, the second particulate material is an accelerator. In yet another embodiment, the third particulate material is an adhesive.

Another aspect of the invention is directed to a compound used in three dimensional printing. The compound comprises a first particulate material, a second particulate material, and a third particulate, wherein the first particulate material and the second particulate material can react to form a solid in a period of time, and the third particulate material can solidify in a longer period of time. In another embodiment, the compound may also include a filler. In another embodiment, the first particulate material is a phosphate. In another embodiment, the second particulate material is an alkaline oxide. In yet another embodiment, the first particulate material is a plaster. In another embodiment, the second particulate material is an accelerator. In yet another embodiment, the third particulate material is an adhesive.

Another aspect of the invention is directed to a method of three-dimensional printing, comprising providing a layer of a dry particulate material comprising a first particulate material, a second particulate material, and a third particulate material and dispensing a fluid onto a region of the first layer. The fluid causes a reaction between the first and second particulate materials to occur, the reaction causing a solidified material to form in the region, and causes the third particulate material to solidify in the region. The reaction between the first and second particulate materials occurs in a period of time, and the third particulate material solidifies in a longer period of time. In another embodiment, the layer of dry particulate material may also include a filler. In another embodiment, the first particulate material is a phosphate. In another embodiment, the second particulate material is an alkaline oxide. In yet another embodiment, the first particulate material is a plaster. In another embodiment, the second particulate material is an accelerator. In yet another embodiment, the third particulate material is an adhesive.

Another aspect of the invention is directed to a mixture of solids used in three dimensional printing that, when contacted by a fluid, undergoes a first solidification reaction occurring at a first rate, and simultaneously undergoes a second solidification reaction occurring at a second rate slower than the first rate.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Preferred non limiting embodiments of the present invention will be described by way of example with reference to the accompanying drawings, in which.

DETAILED DESCRIPTION

The present invention relates to a Three Dimensional Printing material system useful, among other things, for preparing molds for casting, such as molds for metal casting. A large number of metal castings are made by pouring molten metal into a ceramic mold. For sand casting, the mold may be made of sand held together with binders. For investment casting, the mold may be made of refractories, such a alumina powder, held together by silica.

Molds prepared for casting should be sufficiently strong to withstand pouring of a molten material, such as metal, into a mold cavity. However, the mold should also be able to break during the cooling process, or be broken after the cooling process, to allow removal of the molded product.

In a Three Dimensional Printing material system, it is desired to have good depowderablility, sufficient strength, and a quick solidification mechanism when preparing a mold or an appearance model. As used herein, the term "depowderability" is defined as the ability to clean loose powder from a printed article after it has solidified. While the exemplary embodiments described herein are particularly advantageous for molds because of their strength, heat resistance and other characteristics, they can also be used to make appearance models and other articles.

The present invention relates to a Three Dimensional Printing material system comprising a mixture of a first particulate material, a second particulate material, a third particulate material, and a filler. A fluid causes the first particulate material and the second particulate material to react to form a solid in a first period of time, and causes the third particulate material to solidify in a second period of time that is longer than the first period of time. The reaction between the first particulate material and the second particulate material provides initial strength to the printed part during and after the printing process and may promote high accuracy, allow for a shorter time from the end of the print stage to handling and may reduce or eliminate part deformation. Solidification of the third particulate material provides strength to the final product. As used herein, the term "solid" is intended to mean a substance that has a definite volume and shape and resists forces that tend to alter its volume or shape, as well as to include solid-like substances, such as gels. The present invention also relates to a method of use for such a materials system, and to an article made by the method of the invention.

Figure 1:
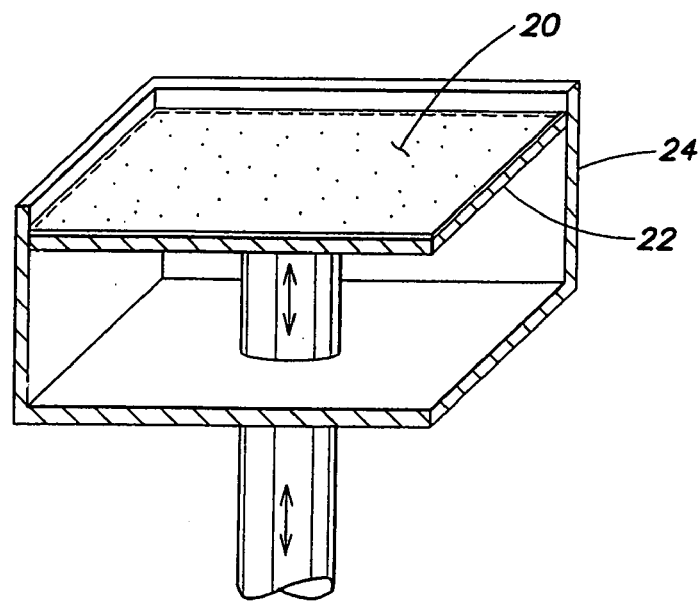
FIG. 1 illustrates schematically a first layer of a mixture of particulate material of the invention deposited onto a downwardly movable surface on which an article is to built, before any fluid has been delivered.

Referring now to FIG. 1, a schematic representation of a printing method using the materials system of the present invention is presented. According to the method, a layer or film of particulate material 20 is applied on a downwardly movable surface 22 of a container 24. The layer or film of particulate material can be formed in any manner, and preferably is applied using a counter-roller. The particulate material applied to the surface includes a first particulate material, a second particulate material, a third particulate material, and a filler. As used herein, "filler" is meant to define an inert material that is solid prior to application of the fluid, which is substantially insoluble in the fluid, and which gives structure to the final article. The first and second particulate materials react in the presence of a fluid to provide initial bond strength to the part being built, while the third particulate material solidifies in a longer period of time to provide final part strength.

For purposes of the present invention, "particulate material" is meant to define any dry material containing significant amounts of particulate material. The particulate material may be soluble in, or interact with the fluid material, or any portion thereof, depending upon the particular embodiment of the invention that is being practiced. For example, in certain embodiments, it may be desirable that the particulate material dissolve in the fluid material.

Generally, the size of the particles in the particulate material is limited by the thickness of the layers to be printed. That is, the particles are preferably approximately smaller than the thickness of the layers to be printed. The particulate materials may have any regular or irregular shape. Using smaller particles may provide advantages such as smaller feature size, the ability to use thinner layers, and the ability to reduce what is known in the art as a "stair stepping" effect. In preferred embodiments, the material systems include particulate material having particles with a mean diameter ranging from about 1 μm to about 300 μm, preferably ranging from about 2 μm to about 250 μm, more preferably ranging from about 10 μm to about 100 μm, and more preferably ranging from about 10 μm to about 50 μm.

The particulate material may include impurities and/or inert particles. The inert particles or any portion of the particulate material can comprise granular, powdered or fibrous materials. Classes of inert particles include a polymer, a ceramic, a metal, an organic material, an inorganic material, a mineral, clay and a salt.

Choosing a suitable particulate material for the material systems of the present invention involves various qualitative evaluations, which may easily be accomplished through routine experimentation by those of ordinary skill in the art. First, a small mound of particulate material is formed, a small depression is formed in the mound, and a small amount of fluid is placed in the depression. Visual observations are made regarding, among other things, the rate at which the fluid diffuses into the particulate material, the viscosity of the particulate material introduction of the fluid, and whether a membrane is formed around the fluid. Next, line testing is performed by filling a syringe filled with fluid and strafing the mounds of particulate material. After a period of about 24 hours, the mounds of particulate material are examined. Those in which pebbles of particulate material have formed are suitable, as it means that the particulate material and fluid react more quickly than the fluid can evaporate or diffuse into the surrounding dry powder. Those in which both pebbles and rods of hardened material have formed are the yet more suitable, indicating that the rate at which the fluid and particulate material harden is greater than the rate at which fluid evaporates or diffuses into the surrounding dry powder. In some instances, the rods of hardened material will shrink, indicating that the particulate material may give rise to problems with distortions. As described above, various additives may be included in the particulate material and/or fluid to accelerate the rate at which the particulate material hardens.

The particulate material may also be evaluated to determine the ease of spreading. Simple test parts may also be formed to determine, inter alias, the flexural strength, the distortion, the rate of hardening, the optimum layer thickness, and the optimum ratio of fluid to particulate material. Material systems suitable for use in the three-dimensional printing method include those hardening with minimal distortion, in addition to relatively high flexural strength. Hardened products with high flexural strength values may not be suitable for use in the three-dimensional printing method, if distortions compromise the accuracy of the final printed articles; this is especially applicable where relatively fine features are desired.

After a material has been identified as a potential material through line testing, the formula may be further developed by printing test patterns on a three dimensional printer. The strength, accuracy, and degree of difficulty in handling may all be characterized with a set of test parts (e.g., breaking bars for strength and gauge blocks for accuracy). These tests may be repeated as much as necessary, and powder formulas are iterated until optimum characteristics are obtained.

According to aspects of embodiments of the present invention, an additional criterion for selecting the particulate materials are the relative rates of reaction and/or solidification in the presence of a fluid. The first particulate material and the second particulate material are selected to react and solidify in the presence of the fluid in a period of time shorter than the solidification of the third particulate material in the presence of the fluid. Solidification of the reaction product of the first and second particulate materials in the presence of the fluid could occur within about 20 minutes. In another embodiment, the first particulate material and the second particulate material react to form a solid within about 10 minutes, preferably within about 5 minutes, more preferably within about 2 minutes, and most preferably within about 1 minute of application of the fluid. The solidification of the third particulate material occurs at a time longer than the reaction between the first particulate material and the second particulate material. In one embodiment, the third particulate material solidifies in a time ranging from about 10 minutes to about 2 hours or more. The absolute period of time for the solidification of the first and second particulate materials and the absolute period of time for solidification of the third particulate material can each vary over a wide range, however, the period of time for solidification of the third particulate material will be at least longer than period of time for solidification of the first particulate material and the second particulate material.

In one embodiment, the first particulate material may be an acid and second particulate material may be a base that react with one another in the presence of a fluid. For example, the first particulate material may be a phosphate while the second particulate material may be an alkaline oxide, and/or an alkaline hydroxide. When an aqueous fluid is printed on a powder that contains these materials, the phosphate dissolves and acts on the alkaline oxide and/or an alkaline hydroxide to form a cement.

The phosphates used in the embodiments of the invention include a salt of an oxygen acid of phosphorus including salts of phosphoric acids such as orthophosphoric acid, polyphosphoric acid, pyrophosphoric acid, and metaphosphoric acid.

As used herein, the term "phosphate" is generic and includes both crystalline and amorphous inorganic phosphates. Further, "phosphate" includes, but is not limited to, orthophosphates and condensed phosphates. Orthophosphates are compounds having a monomeric tetrahedral ion unit $(PO_4)^{3-}$. Typical orthophosphates include sodium orthophosphates, such as, monosodium phosphate, disodium phosphate, trisodium phosphate, potassium orthophosphates and ammonium orthophosphates. Phosphates are further described in U.S. Pat. No. 6,299,677 to Johnson et al. and incorporated by reference in its entirety for all purposes.

Examples of acid phosphates that may be used in embodiments of the invention include, but are not limited to, monoammonium phosphate; sodium aluminum phosphate, acidic; monocalcium phosphate, anhydrous; monopotassium phosphate; monosodium phosphate; and aluminum acid phosphate. Examples of acid polyphosphates that may be used in embodiments of the invention include, but are not limited to, sodium tripolyphosphate; sodium hexametaphosphate; sodium polyphosphate, anhydrous; and ammonium polyphosphate. Examples of acid pyrophosphates that may be used in embodiments of the invention include, but are not limited to, sodium acid pyrophosphate; tetrasodium pyrophosphate; tetrapotassium pyrophosphate. Examples of other phosphates that may be used in embodiments of the invention include, but are not limited to, diammonium phosphate; dipotassium phosphate; disodium phosphate; monocalcium phosphate, monhydrate; dicalcium phosphate, dihydrate; dicalcium phosphate, anhydrous; tricalcium phosphate; disodium phosphate; and tripotassium phosphate. In a preferred embodiment, the phosphate is a phosphate salt, such as, monocalcium phosphate, anhydrous; sodium aluminum phosphate, acidic; aluminum acid phosphate; monoammonium phosphate; monopotassium phosphate; and combinations thereof.

Alkaline oxides that may be used as the second particulate material include, but are not limited to, zinc oxide; magnesium oxide; calcium oxide; copper oxide; beryllium oxide; bismuth oxide; cadmium oxide; tin oxide; red lead oxide; and combinations thereof. Examples of alkaline hydroxides that may be used as the second particulate material include, but are not limited to, magnesium hydroxide, beryllium dihydroxide, cobalt trihydroxide, and combinations thereof. In one embodiment, the second particulate material is an alkaline oxide. In a preferred embodiment, the alkaline oxide is magnesium oxide. Magnesium oxide may react with phosphate compounds to form magnesium phosphate cement. In one embodiment, the ratio of magnesium oxide and acid phosphate salt may be varied to accommodate a variety of resin, filler, and binder chemistries.

In another embodiment, magnesium oxide may react with sulfate containing compounds to form magnesium oxysulfate cement, or react with chloride containing compounds to form magnesium oxychloride cement. In another embodiment, zinc oxide may react with sulfate containing compounds or chloride containing compounds. Examples of sulfate containing compounds include, but are not limited to, magnesium sulfate and zinc sulfate. Examples of chloride containing compounds include, but are not limited to, magnesium chloride, zinc chloride, and calcium chloride.

In another embodiment, the first particulate material may be plaster, and the second particulate material may be an accelerator. Plaster is frequently called "Plaster of Paris," a name derived from the earths of Paris and its surrounding regions, which contain an abundance of the mineral gypsum, from which Plaster of Paris is manufactured. Plaster is also referred to by many other names, including, but not limited to, sulphate of lime, semihydrate of calcium sulfate, casting plaster, gypsum plaster, hydrated sulphate of lime, hydrated calcium sulphate, and dental plaster, as well as a variety of trade names. The term "plaster," as used herein, is meant to define any variety of material including a substantial amount of $CaSO_4 \cdot \frac{1}{2}H_2O$ that is in powder form prior to the application of an aqueous fluid. The terms "hydrated plaster" and "set plaster" are used interchangeably herein, and are meant to include any variety of plaster that includes a substantial amount of $CaSO_4 \cdot 2H_2O$ after setting, or rehydration. Many varieties of plaster are commercially available, varying, for example, in structural strength, the time required for setting, and in volume changes that occur during the setting. Typically, commercially available plasters include other ingredients such as, but not limited to, silica, powdered limestone, starch, Terra Alba, and lime. Examples of commercially available plaster materials that may be suitable for the embodiments of the present invention include, but are not limited to, white hydrocal cement, durabond 90, and drystone (each available from U.S. Gypsum, located in Chicago, Ill.), as well as most brands of casting plaster, molding plaster, and spackling compound.

An accelerator may be used as the second particulate material. "Accelerator," as used herein, is meant to define any material that increases the rate at which plaster sets. Examples of ways to accelerate the rate of plaster include, but are not limited to, increasing the solubility of plaster in water, by providing additional nucleation sites for crystal formation or increasing the growth rate of crystals. Accelerators are generally used sparingly in conventional plaster processing, as they may adversely affect the strength characteristics of the plaster. However, accelerators are preferred in some embodiments of the present invention because they help produce a relatively quick set during printing and further processing. The potential adverse effect to the strength characteristics of the plaster is of less importance since the third particulate material is present to provide strength to the final part. Suitable accelerators include, but are not limited to, Terra Alba, potassium sulfate, barium sulfate, ammonium sulfate, sodium chloride, under calcinedplaster, alum, potassium alum, lime, calcined lime, and combinations thereof. Terra Alba, which is raw ground gypsum, is a preferred accelerator, and works by providing additional nucleation sites for gypsum crystal formation. Another preferred accelerator is potassium sulfate, which is thought to work by increasing the solubility of the plaster in the water. Both Terra Alba and potassium sulfate also increase the final strength of the article. In one embodiment, at least one accelerator is preferably used as a second particulate material in order to increase the rate at which the plaster sets. Plaster chemistry is further described in U.S. patent application Ser. No. 09/832,309 filed Apr. 10, 2001 which is a continuation of U.S. patent application Ser. No. 09/182,295 filed Oct. 29, 1998, and is incorporated herein by reference in its entirety for all purposes. The third particulate material of the embodiments of the invention reacts in the presence of an fluid to solidify at a rate slower than that of the reaction between the first particulate material and the second particulate material, and imparts strength to the final part. In one embodiment, the third particulate material is an adhesive. In another embodiment, the third particulate material is a filler coated with an adhesive.

The adhesive is a compound selected for the characteristics of high solubility in the fluid, low solution viscosity, low hygroscopicity, and high bonding strength. The adhesive should be highly soluble in the fluid in order ensure that it is incorporated rapidly and completely into the fluid. Low solution viscosity is preferred to ensure that once dissolved in the fluid, the solution migrates quickly to sites in the powder bed to adhesively bond together the reinforcing materials. The adhesive is preferably milled as finely as possible prior to admixture with the filler and/or prior to coating the filler particles in order to increase the available surface area, enhancing dissolution in the solvent, without being so fine as to cause "caking," an undesirable article characteristic. Typical adhesive particle grain sizes are about 10–40 μm. Low hygroscopicity of the adhesive avoids absorption of excessive moisture from the air and evaporating fluid in printed regions of the powder bed which causes "caking", in which unactivated powder spuriously adheres to the outside surface of the part, resulting in poor surface definition.

Water-soluble compounds are preferred for the adhesive in embodiments of the present invention, although other compounds can be used. Compounds suitable for use as the adhesive in embodiments of the present invention may be selected from the following non-limiting list: water-soluble polymers, carbohydrates, sugars, sugar alcohols, proteins, and some inorganic compounds. Water-soluble polymers with low molecular weights dissolve more quickly because smaller molecules diffuse more rapidly in solution. Suitable water-soluble polymers include but are not limited to, polyethylene glycol, sodium polyacrylate, polyacrylic acid, polyvinyl alcohol, polyvinyl pyrrolidone, sodium polyacrylate copolymer with maleic acid, polyvinyl alcohol copolymer with polyvinyl acetate, and polyvinyl pyrrolidone copolymer with vinyl acetate, a copolymer of octylacrylamide/acrylate/butylaminoethyl methacrylate, polyethylene oxide, sodium polystyrene sulfonate, polyacrylic acid, polymethacrylic acid, copolymers of polyacrylic acid and methacrylic acid with maleic acid, and alkali salts thereof, maltodextrine, hydrolyzed gelatin, sugar, polymethacrylic acid, polyvinyl sulfonic acid, sulfonated polyester, poly(2-ethyl-2-oxazoline), polymers incorporating maleic acid functionalities, and combinations thereof. Carbohydrates include, but are not limited to, acacia gum, locust bean gum, pregelatinized starch, acid-modified starch, hydrolyzed starch, sodium carboxymethylcellulose, sodium alginate and hydroxypropyl cellulose. Suitable sugars and sugar alcohols include sucrose, dextrose, fructose, lactose, polydextrose, sorbitol and xylitol. Organic compounds including organic acids and proteins can also be used, including citric acid, succinic acid, polyacrylic acid, gelatin, rabbit-skin glue, soy protein, and urea. Inorganic compounds include plaster, bentonite, sodium silicate and salt.

In another embodiment, a mixture of solid material is contacted by a fluid, and undergoes a first solidification beginning with the fluid contact and occurring at a first rate, and also undergoes a second solidification reaction beginning with the fluid contact and occurring at a second rate slower than the first rate. As used herein, the term "solid material" includes particulate material, aggregates, and the like. In one embodiment of the invention, a solid material may include more than one type of material, such as, a particulate material having a coating that is activated by the fluid causing a solidification reaction to occur within the solid material and among adjacent solid material. As used herein, the term "solidification reaction" is defined as any chemical, thermal, or physical process wherein free flowing solid material are hardened, bonded, or firmly fixed in relation to other adjacent solids.

In one embodiment, the mixture may be a mixture of two solid materials, wherein one of the solid materials is present in excess of a quantity that will react with the other solid material. In this embodiment, when contacted by a fluid, the two solids materials react and solidify in a first period of time, and the excess of one of the solid materials left over from the reaction with the other solid material reacts when contacted by a fluid in a second period of time that is longer than the first period of time. For example, the mixture may comprise an alkaline oxide, such as magnesium oxide, and at least one of polyacrylic acid, polymethacrylic acid, copolymers of polyacrylic acid and methacrylic acid with maleic acid, and alkali salts thereof. In the presence of a fluid, the alkaline oxide reacts with a portion of the at least one of polyacrylic acid, polymethacrylic acid, citric acid, succinic acid, malic acid, copolymers of polyacrylic acid and methacrylic acid with maleic acid, and alkali salts thereof to form a solid. The remaining portion of the at least one of polyacrylic acid, polymethacrylic acid, citric acid, succinic acid, malic acid, copolymers of polyacrylic acid and methacrylic acid with maleic acid, and alkali salts thereof left over from the reaction with the alkaline oxide may then solidify in the presence of a fluid in a longer period of time.

In another embodiment, the mixture may comprise two solids, wherein one solid material solidifies in the presence of a fluid in one period of time, while the other particulate material solidifies in the presence of a fluid in a second period of time that is longer than the first period of time.

In another embodiment, the mixture may comprise three solid materials, wherein a first and second solid material react in the presence of a fluid to form a solid in one period of time, and the third solid material solidifies in the presence of a fluid in a longer period of time. In an alternative embodiment, a first solid material may solidify in the presence of a fluid in one period of time, and a second solid material and third solid material may react to form a solid in the presence of a fluid in a second period of time that is longer than the first period of time.

In another embodiment, the mixture may comprise a first coated particulate material and a second particulate material. In one embodiment, the first coated particulate material reacts to form a solid in one period of time when contacted by a fluid and the second particulate material solidifies when contacted by a fluid in longer period of time. In another embodiment, a first coated particulate material reacts to form a solid in one period of time when contacted by a fluid and a second particulate material solidifies when contacted by a fluid in a shorter period of time. In another embodiment, one or more particulate material may be encapsulated, or present in an aggregate.

The fluid in embodiments of the present invention is selected to comport with the degree of solubility required for the various particulate components of the mixture, as described above. The fluid comprises a solvent in which the third particulate material and at least one of the first particulate material and the second particulate material are active, preferably soluble, and may include processing aids such as a humectant, a flowrate enhancer, and a dye. An ideal solvent is one in which the third particulate material and at least one of the first particulate material, the second particulate material, and the third particulate material is highly soluble, and in which the filler is insoluble or substantially less soluble. The fluid can be aqueous or non-aqueous. In a preferred embodiment, an aqueous fluid comprises at least one cosolvent. Suitable solvents and cosolvents may be selected from the following non-limiting list: water; methyl alcohol; ethyl alcohol; isopropyl alcohol; acetone; methylene chloride; acetic acid; ethyl acetoacetate; dimethylsulfoxide; n-methyl pyrrolidone; 2-amino-2-methyl-1-propanol; 1-amino-2-propanol; 2-dimethylamino-2-methyl-1-propanol; N,N-diethylethanolamine; N-methyldiethanolamine; N,N-dimethylethanolamine; triethanolamine; 2-aminoethanol; 1-[bis[3-(dimethylamino) propyl]amino]-2-propanol; 3-amino-1-propanol; 2-(2-aminoethylamino)ethanol; tris(hydroxymethyl)aminomethane; 2-amino-2-ethyl-1,3-propanediol; 2-amino-2-methyl-1,3-propanediol; diethanolamine; 1,3-bis(dimethylamino)-2-propanol; and combinations thereof. Other polar organic compounds will be obvious to one skilled in the art. In a preferred embodiment, the fluid is an aqueous solution of 2-amino-2-methyl-1-propanol, with isopropanol, ethanol, or a combination of both.

The filler in embodiments of the present invention is a compound selected for the characteristics of insolubility, or extremely low solubility in the fluid, rapid wetting, low hygroscopicity, and high bonding strength. The filler provides mechanical structure to the hardened composition. Sparingly soluble filler material may be used, but insoluble filler material is preferred. The filler particles become adhesively bonded together when the first particulate material and the second particulate material interact upon application of the fluid. The filler particles are further bonded together when the third particulate material dries/hardens after the fluid has been applied. Preferably, the filler includes a distribution of particle grain sizes, ranging from the practical maximum of about 250–300 μm downward, to the practical minimum of about 1 μm. Large grain sizes appear to improve the final article quality by forming large pores in the powder through which the fluid can migrate rapidly, permitting production of a more homogeneous material. Smaller grain sizes serve to reinforce article strength.

Compounds suitable for use as the filler in embodiments of the present invention may be selected from the same general groups from which the third particulate material is selected, provided that the solubility, hygroscopicity and bonding strength criteria described above are met. Examples of fillers include, but are not limited to, limestone, olivine, zircon, alumina, staurolite, and fused silica. In one embodiment, the filler may be a granular refractory particulate, including, but not limited to, limestone, staurolite, silica sand, zircon sand, olivine sand, chromite sand, magnesite, alumina silicate, calcium silicate, fused silica, calcium phosphate, rutile, bentonite, montmorillonite, glass, chamotte, fireclay, and mixtures thereof. In a preferred embodiment, the filler is olivine, a mineral used for foundry sand ((Mg—Fe)$_2$SiO$_4$) that is low in crystalline silica and possesses a low coefficient of thermal expansion. In another preferred embodiment, the filler is zircon (ZrSiO$_4$).

Figure 2:
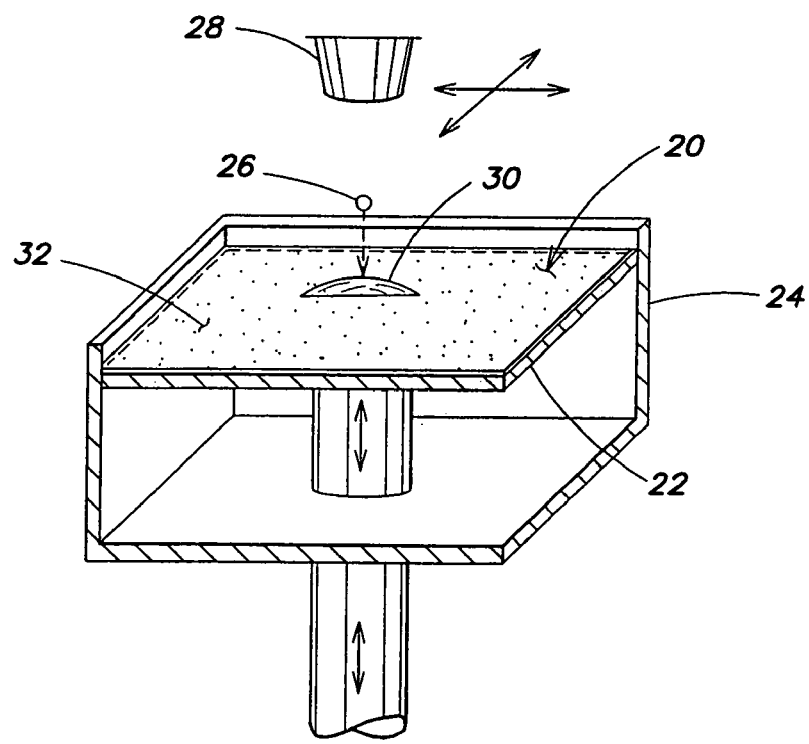
FIG. 2 illustrates schematically an ink-jet nozzle delivering a fluid to a portion of the layer of particulate material of FIG. 1 in a predetermined pattern.

Various processing aids may be added to the particulate material, the fluid, or both, including, but not limited to, accelerators, adhesives, flowrate enhancers, humectants, visible dyes, fiber, filler, and combinations thereof. Examples of these and other additives may be found in U.S. Pat. No. 5,902,441 to Bredt et al. and U.S. Pat. No. 6,416,850 to Bredt et al., both incorporated by reference in their entirety for all purposes FIG. 2 is a schematic representation of an ink-jet nozzle 28 delivering fluid 26 to a portion 30 of the layer or film 20 of the particulate mixture in a two-dimensional pattern. According to the method, the fluid 26 is delivered to the layer or film of particulate material in any predetermined two-dimensional pattern (circular, in the figures, for purposes of illustration only), using any convenient mechanism, such as a Drop-On-Demand (hereinafter "DOD") printhead driven by customized software which receives data from a computer-assisted-design (hereinafter "CAD") system, a process which is known in the art. The first portion 30 of the particulate mixture is by the fluid, causing the first particulate material and the second particulate material to adhere together and the third particulate material to adhere to form an essentially solid circular layer that becomes a cross-sectional portion of the final article. As used herein, "activates" is meant to define a change in state from essentially inert to adhesive. When the fluid initially comes into contact with the particulate mixture, it immediately flows outward (on the microscopic scale) from the point of impact by capillary action, dissolving the adhesive within the first few seconds. A droplet of fluid, typically having a volume of about 100 pl, may spread to a surface area of about 100 μm once it comes into contact with the particulate mixture. As the solvent dissolves the third particulate material and at least one of the first particulate material and second particulate material, the fluid viscosity increases dramatically, arresting further migration of the fluid from the initial point of impact. Within a few minutes, the fluid with dissolved particulate material therein infiltrates the less soluble and slightly porous particles, forming bonds between the filler particles. The fluid is capable of bonding together the particulate mixture in an amount that is several times the mass of a droplet of the fluid. As volatile components of the fluid evaporate, the adhesives harden, joining the filler into a rigid structure, which becomes a cross-sectional portion of the finished article.

Any unactivated particulate mixture 32 that was not exposed to the fluid remains loose and free-flowing on the movable surface. Preferably, the unactivated particulate mixture is left in place until formation of the final article is complete. Leaving the unactivated, loose particulate mixture in place ensures that the article is supported during processing, allowing features such as overhangs, undercuts, and cavities (not illustrated, but conventional) to be defined without using support structures. After formation of the first cross-sectional portion of the final article, the movable surface is indexed downward.

Using, for example, a counter-rolling mechanism, a second film or layer of the particulate mixture is then applied over the first, covering both the rigid first cross-sectional portion, and any loose particulate mixture by which it is surrounded. A second application of fluid follows in the manner described above, dissolving the adhesive and forming adhesive bonds between a portion of the previous cross-sectional portion, the filler, and, optionally, fiber of the second layer, and hardening to form a second rigid cross-sectional portion added to the first rigid cross-sectional portion of the final article. The movable surface is again indexed downward.

Figure 3:
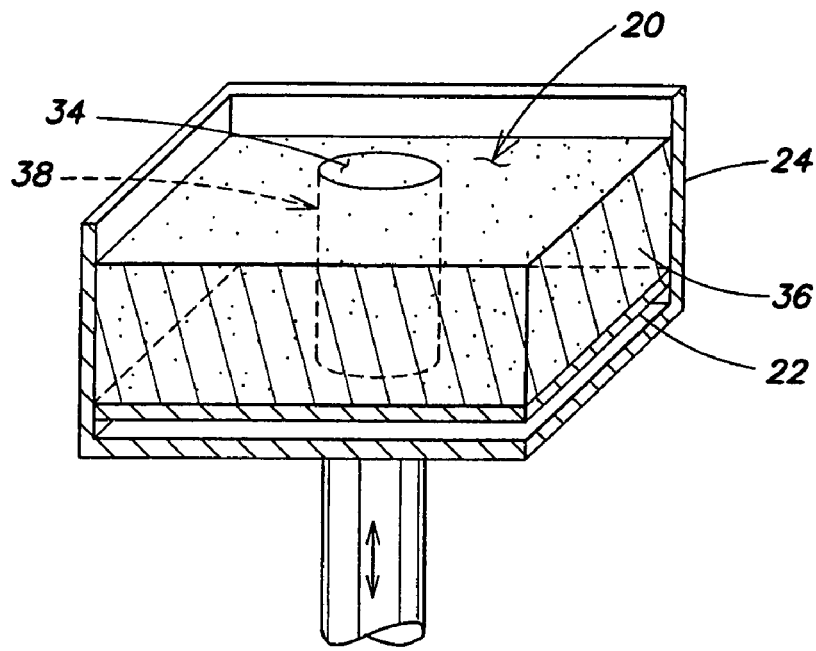
FIG. 3 illustrates schematically a view of a final article made from a series of steps illustrated in FIG. 2 enclosed in the container while it is still immersed in the loose unactivated particles.

Applying a layer of particulate mixture, including the adhesive, applying the fluid, and indexing the movable surface downward are repeated until the final article is completed. FIG. 3 is a schematic representation of the final cylindrical article after it has been completely formed. At the end of the process, only the top surface 34 of a final article 38 is visible in the container. The final article is preferably completely immersed in a bed 36 of unactivated particulate material. Alternatively, those skilled in this art would know how to build an article in layers upward from an immovable platform, by successively depositing, smoothing and printing a series of such layers.

Figure 4:
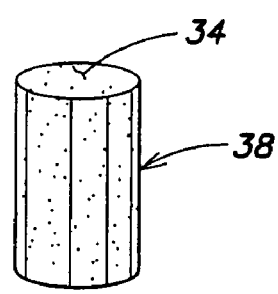
FIG. 4 illustrates schematically a view of the final article from FIG. 3.

FIG. 4 is a schematic representation of the final cylindrical article 38. The unactivated particulate material is preferably removed by blown air or a vacuum. After removal of the unactivated particulate material from the final article 38, post-processing treatment may be performed, including cleaning, infiltration with stabilizing materials, painting, etc.

Figure 5:
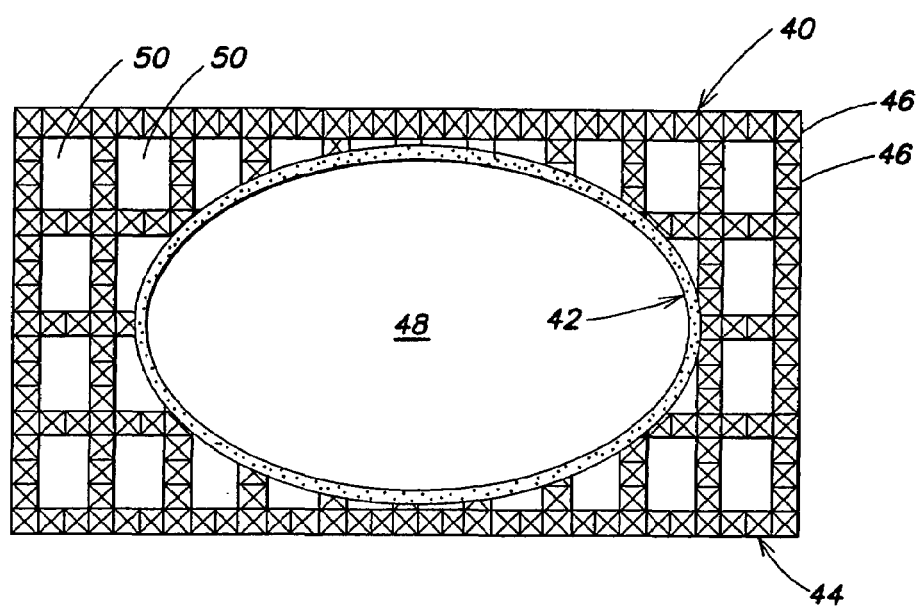
FIG. 5 illustrates schematically a cross-sectional view of a mold, including a support structure, for fabricating a casting.

FIG. 5 illustrates a mold prepared using the three-dimensional printing techniques of on embodiment of the present invention. Mold 40 comprises an inner shell 42, an outer shell 44, and supports 46 to provide added strength to the inner shell during the casting process. After three-dimensional printing is completed, unactivated particulate material is removed from cavity 48, thus providing a casting surface. Unactivated particulate material may, but need not be, removed from interstitial spaces 50. Unactivated particulate material remaining in the interstitial spaces may provide additional strength to the inner shell during subsequent casting.

Embodiments of the present invention is further illustrated by the following Examples which in no way should be construed as further limiting. The following representative formulas are directed to preparing molds for investment casting.

Particulate Formulation I
67% Olivine sand (−140 mesh)
29.6% Plaster
3% PVA
0.3% Terra alba
0.1% $K_2SO_4$.

In Formulation I, Olivine is a mineral used for foundry sand ((Mg—Fe)$_2$ SiO$_4$) that is low in crystalline silica and possesses a low coefficient of thermal expansion. Olivine sand (−140 mesh) is bonded with plaster (Hydrocal) and PVA, but the bond between PVA and olivine is sufficiently strong that much less resin is needed. The reduced organic content causes molds made with the formulation of Example II, to emit less smoke during casting. This improves the environmental conditions during casting, and leads to higher quality castings due to the formation of less gas bubbling. The mold resulting from this formulation is suitable for low-temperature casting, such as casting Aluminum, Magnesium and Zinc.

Fluid I
92.6% Water
6.0% glycerol
0.5% isopropanol
0.5% polyvinyl pyrrolidone
0.2% 2,4,7,9-tetramethyl-5-decyne-4,7-diol ethoxylate
0.2% potassium sorbate Fluid I is a preferred fluid for particulate formulation I.

Particulate Formulations II and III are intended for high temperature material casting such as for brass, cast iron, and steel. Because plaster decomposes at around 1200° C. and releases sulfur dioxide, it is not desirable to use it for high temperature casting.

Particulate Formulation II
83.9% Zircon
2.5% octacrylamide/acrylate/butylaminoethyl methacrylate copolymer
1.5% Zinc oxide
10% limestone
1.28% MgO
0.72% monocalcium phosphate, anhydrate
0.1% ethylene glycol octyl/decyl diester Magnesium phosphate cement forms bonds early in the curing process to resist the drying stresses and attendant part distortion. The active cement filler is formed by the combination of magnesium oxide with monocalcium phosphate, anhydrate. Any commercially available grade of magnesium oxide or monocalcium phosphate, anhydrate may be used. This material rapidly forms a gel that maintains the dimensional stability of the part while the octylacrylamide/acrylate/butylaminoethyl methacrylate copolymer, having a particle size of less than about 70 µm, dissolves and deposits itself into the pores of the granular solid, forming stronger bonds that support the material during handling up the casting stage. Zircon (ZrSiO$_4$) having a 140 mesh particle size is a very refractory (foundry sand) filler that has a very low coefficient of thermal expansion. The remaining ingredients: Zinc oxide having a particle size of about 10 microns, limestone having a particle size of less than about 40 microns, and ethylene glycol octyl/decyl diester are added in order to control the flow of powder during spreading and printing. Any commercially available grade of ethylene glycol octyl/decyl diester may be used.

Particulate Formulation III
75.9% Olivine
2.0% octacrylamide/acrylate/butylaminoethyl methacrylate copolymer
2.4% ZnO
15.9% fused silica (SiO$_2$)
2.2% MgO
1.4% monocalcium phosphate, anhydrous
0.18% ethylene glycol octyl/decyl diester
0.02% sorbitan trioleate (SPAN 85 )

In this formula, olivine replaces zircon as the refractory filler. Olivine has a slightly higher thermal expansion than zircon, but since it is lower density, the printed parts are lighter and easier to manipulate. The magnesium oxide/monocalcium phosphate cement enables parts to be built and removed from the machine rapidly, and placed in a drying oven to harden the organic copolymer to full strength. Zinc oxide and fused silica, having a particle size of about 200 mesh, are fine powdered additives. Ethylene glycol octyl/decyl diester and sorbitan trioleate are oily liquids that give the powder a small degree of cohesion, further improving the friction characteristics.

Fluid II
86.5% water
10.0% isopropanol
2.5% 2-amino-2-methyl-1-propanol
1% 2,4,7,9-tetramethyl-5-decyne-4,7-diol ethoxylate In Fluid II, the water component dissolves the phosphate allowing the phosphate to act on the magnesium oxide to form a cement. Fluid II includes 2-amino-2-methyl-1-propanol, an organic alkali that is compatible with the octylacrylonitrile/acrylate/butylaminoethyl methacrylate copolymer and dissolves the copolymer. Isopropanol and 2,4,7,9-tetramethyl-5-decyne-4,7-diol ethoxylate facilitate wetting of the fluid in the powder.

Further considerations when selecting the adhesive, filler and fiber depend on the desired properties of the final article. The final strength of the finished article depends largely on the quality of the adhesive contacts between the particles of the mixture, and the size of the empty pores that persist in the material after the adhesive has hardened; both of these factors vary with the grain size of the particulate material. In general, the mean size of the grains of particulate material is preferably not larger than the layer thickness. A distribution of grain sizes increases the packing density of the particulate material, which in turn increases both article strength and dimensional control.

The materials and method of the illustrative embodiments of the present invention present several advantages over prior Three Dimensional Printing methods. The particulate materials provide a relatively rapid binding reaction in addition to a relatively longer reaction time for preparing the final part. The additional rapid binding mechanism may provide high accuracy, allow for shorter printing and handling time and may reduce or eliminate part deformation. The materials used in embodiments of the present invention are relatively non-toxic and inexpensive. Because the binding particles are added directly to the particulate mixture, adhesive, particularly adhesive including high levels of suspended solids, need not be sprayed through the printhead. Instead, embodiments of the present invention involves spraying preferably an aqueous solvent, which overcomes problems such as clogging associated with prior art methods that involve spraying a binder to a layer of powder.

Those skilled in the art will readily appreciate that all parameters listed herein are meant to be exemplary and actual parameters depend upon the specific application for which the methods and materials of the present invention are used. It is, therefore, to be understood that the foregoing embodiments are presented by way of example only and that, within the scope of the appended claims and equivalents thereto, the invention can be practiced otherwise than as specifically described.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising", "including", "carrying", "having", "containing", "involving", and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, section 2111.03.

The invention claimed is:

1. A solid article comprising:
 a product of a mixture of a plurality of particles of:
  a first particulate material comprising monocalcium phosphate, anhydrous;
  a second particulate material comprising magnesium oxide; and
  a third particulate material comprising polyvinyl alcohol, wherein the first particulate material and the second particulate material can react to form a solid in a period of time, and the third particulate material can solidify in a longer period of time when the mixture is contacted by a fluid during three-dimensional printing, the article having been formed by three-dimensional printing and comprising a plurality of layers of the mixture.

2. The article of claim 1, wherein the first particulate material and the second particulate material react in the presence of the fluid.

3. The article of claim 2, wherein at least one of the first particulate material and the second particulate material is substantially soluble in the fluid.

4. The article of claim 2, wherein the fluid is aqueous.

5. The article of claim 1, wherein the mixture of plurality of particles further comprises a filler.

6. The article of claim 5, wherein the filler is selected from the group consisting of: limestone, staurolite, silica sand, zircon sand, olivine sand, chromite sand, magnesite, alumina silicate, calcium silicate, fused silica, calcium phosphate, rutile, bentonite, montmorillonite, glass, chamotte, fireclay, and mixtures thereof.

7. A compound used in three-dimensional printing, comprising:
 a dry particulate mixture of:
  a first dry particulate material comprising monocalcium phosphate, anhydrous;
  a second dry particulate material comprising magnesium oxide; and
  a third dry particulate material comprising polyvinyl alcohol, wherein the dry particulate mixture can be used in three-dimensional printing to form an article comprised of a plurality of layers, the first particulate material and the second particulate material can react to form a solid in a period of time, and the third particulate material can solidify in a longer period of time when the mixture is contacted by a fluid during three-dimensional printing.

8. The compound of claim 7, wherein the first particulate material and the second particulate material react in the presence of the fluid.

9. The compound of claim 8, wherein at least one of the first particulate material and the second particulate material is substantially soluble in the fluid.

10. The compound of claim 7, wherein the mixture of plurality of particles further comprises a filler.

11. The compound of claim 10, wherein the filler is selected from the group consisting of: limestone, staurolite, silica sand, zircon sand, olivine sand, chromite sand, magnesite, alumina silicate, calcium silicate, fused silica, calcium phosphate, rutile, bentonite, montmorillonite, glass, chamotte, fireclay, and mixtures thereof.

12. The compound of claim 8, wherein the fluid is aqueous.

13. A dry particulate mixture of solids used for three-dimensional printing that, when contacted by a fluid during three-dimensional printing to form an article comprised of a plurality of layers, undergoes a first solidification reaction beginning with the fluid contact and occurring at a first rate, and also undergoes a second solidification reaction beginning with the fluid contact and occurring at a second rate slower than the first rate, wherein the dry particulate mixture comprises:

a first dry particulate material comprising monocalcium phosphate, anhydrous;

a second dry particulate material comprising magnesium oxide; and a third dry particulate material comprising polyvinyl alcohol.

* * * * *